Nov. 27, 1956 H. E. WALKER 2,771,632
MECHANISM FOR PREPARING FISH FOR CANNING
Filed Jan. 29, 1953 5 Sheets-Sheet 1
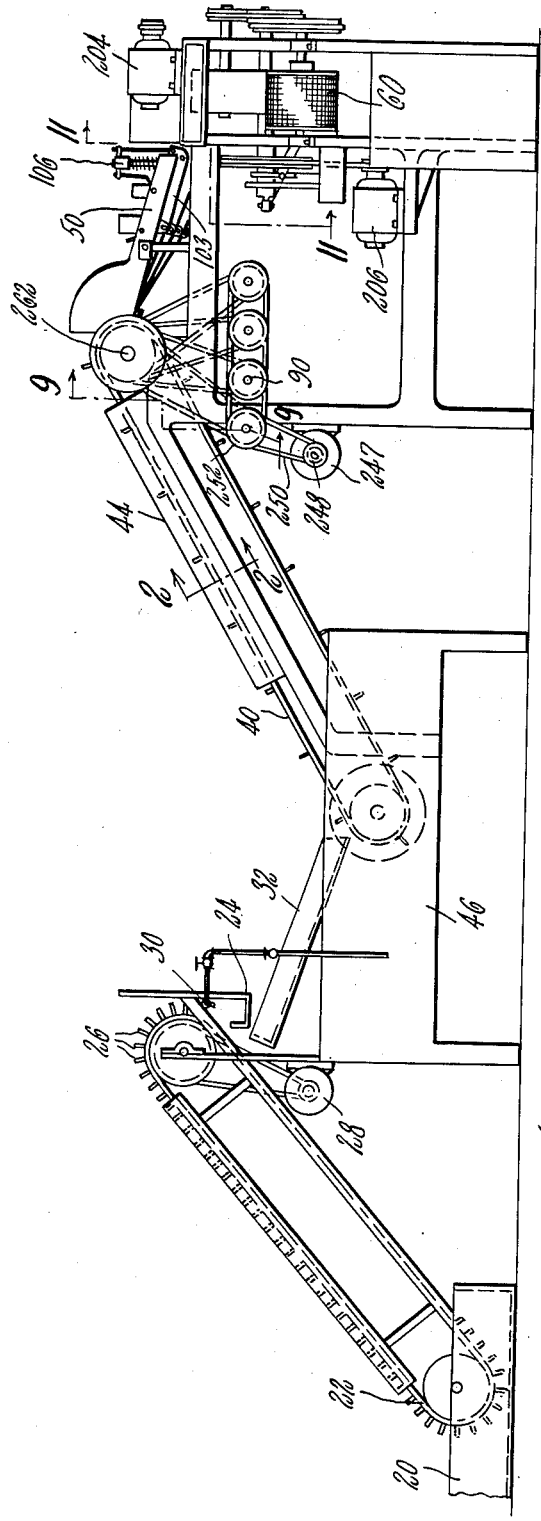
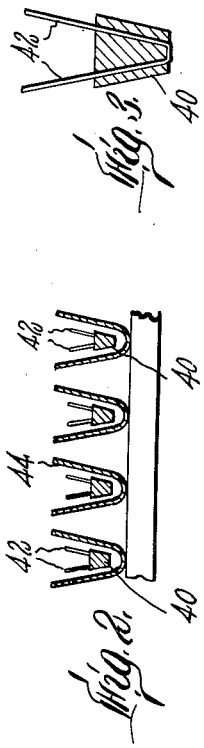
Inventor
Harry E. Walker
by Wright, Brown,
Quinby May Attys.

Nov. 27, 1956
H. E. WALKER
2,771,632
MECHANISM FOR PREPARING FISH FOR CANNING
Filed Jan. 29, 1953
5 Sheets-Sheet 2
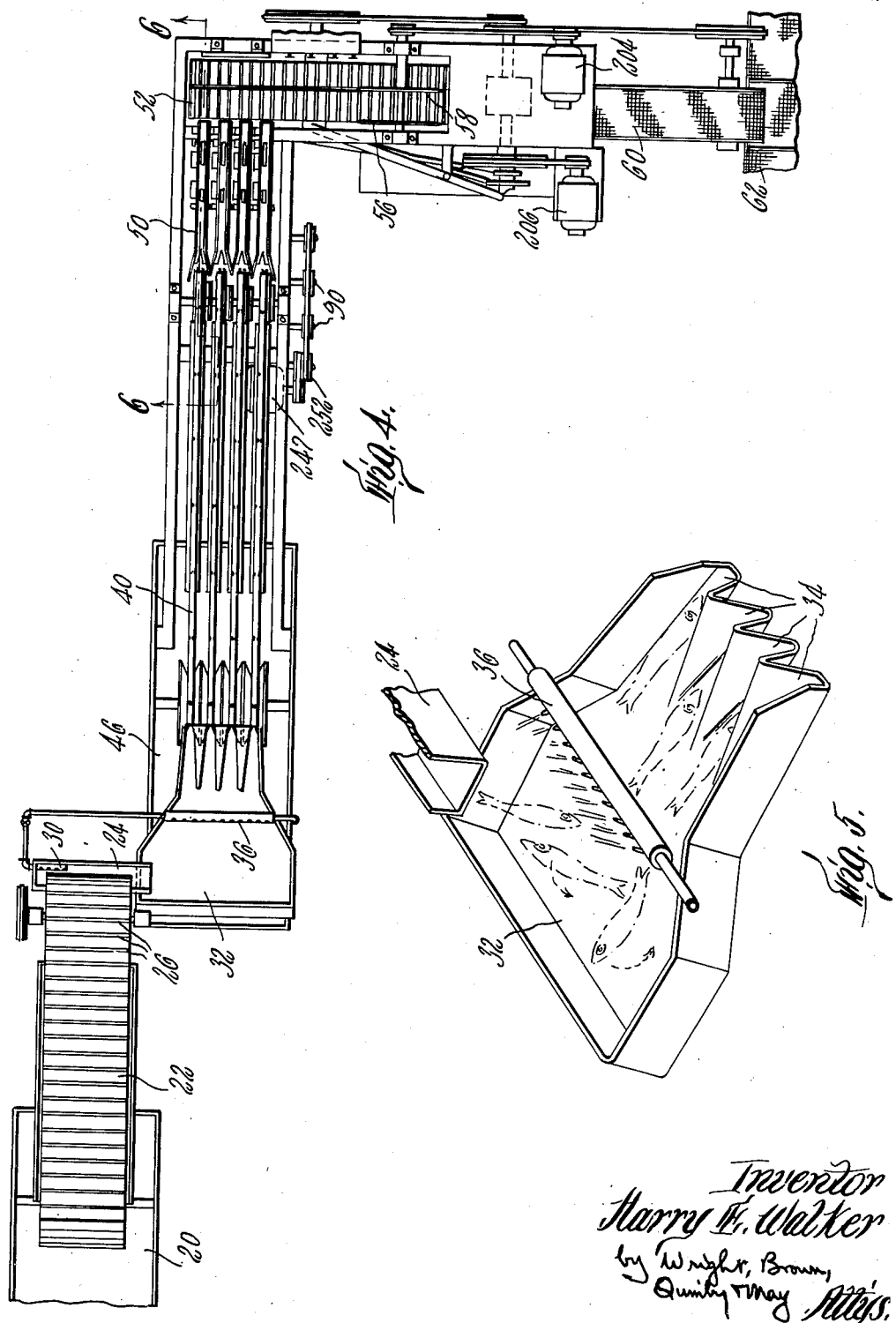

Nov. 27, 1956
H. E. WALKER
2,771,632
MECHANISM FOR PREPARING FISH FOR CANNING
Filed Jan. 29, 1953
5 Sheets-Sheet 3
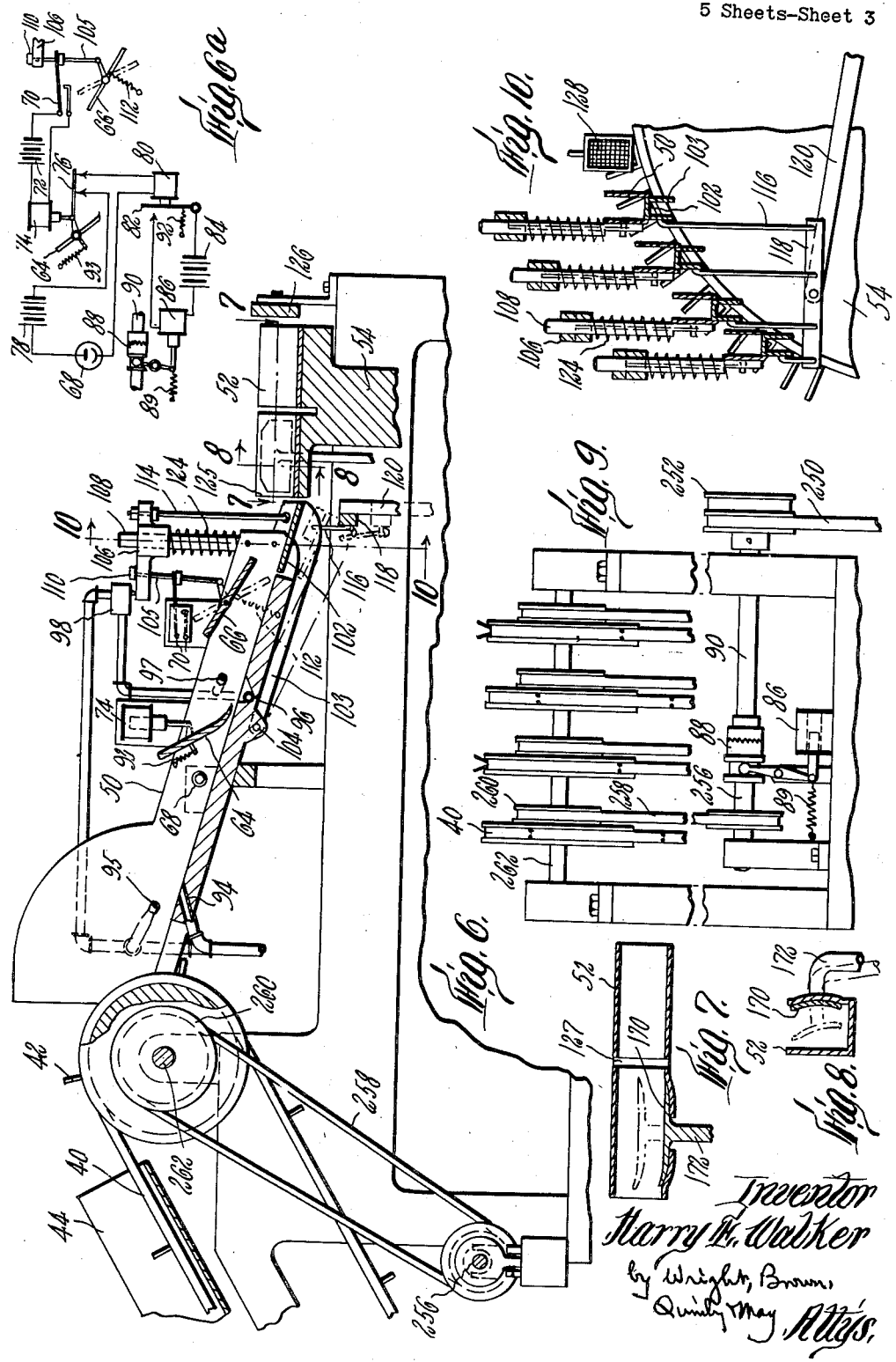

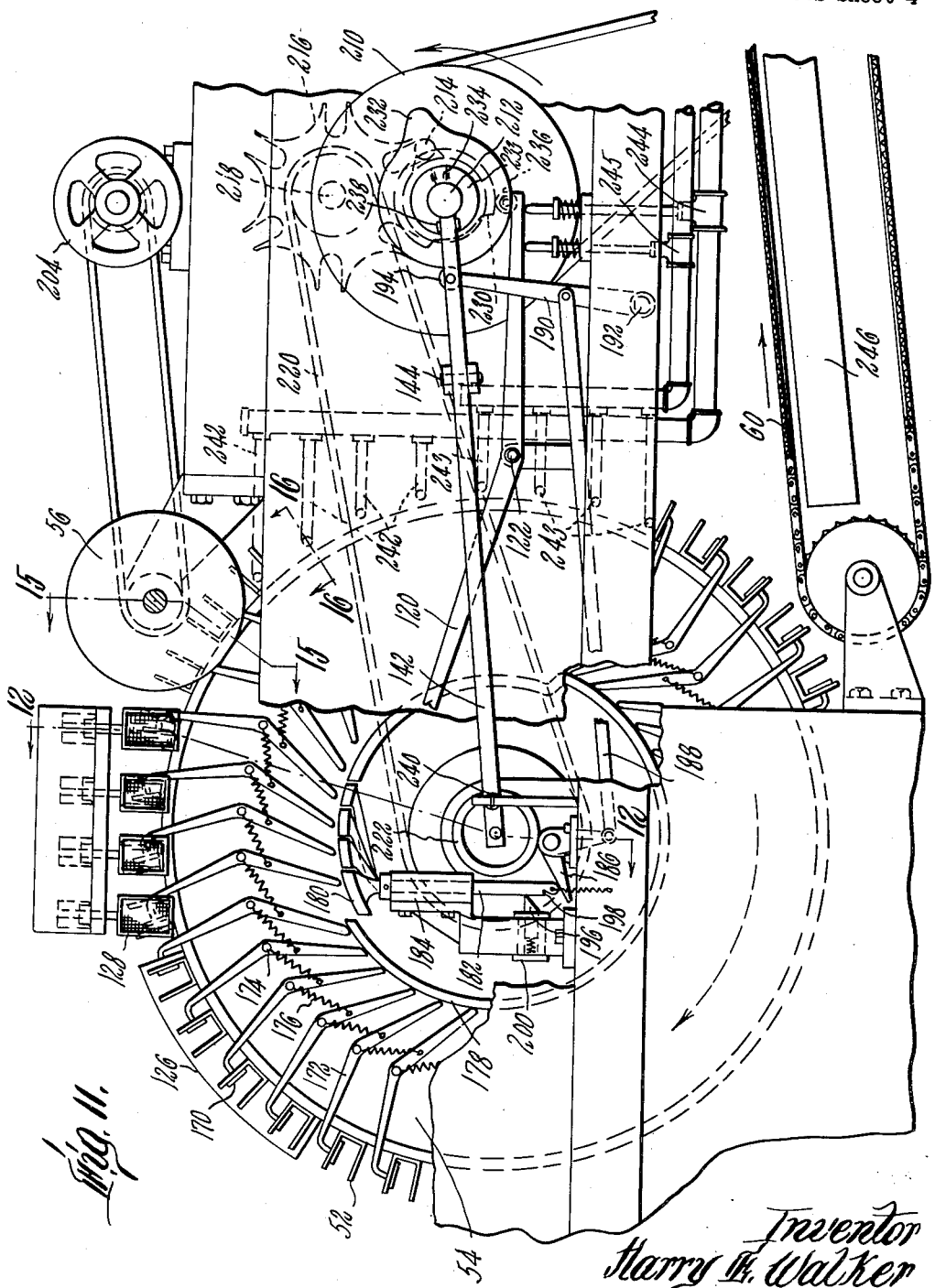

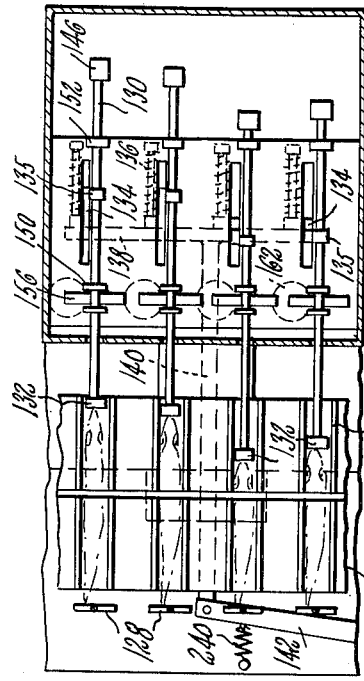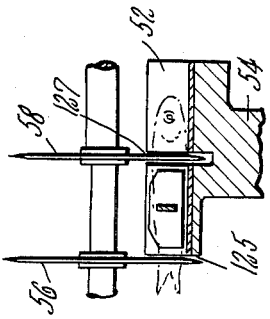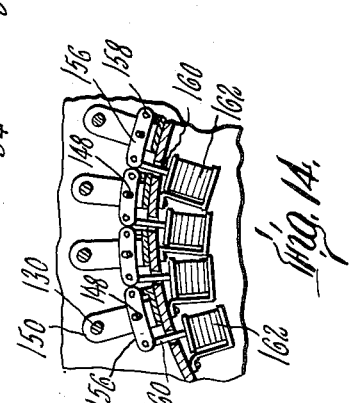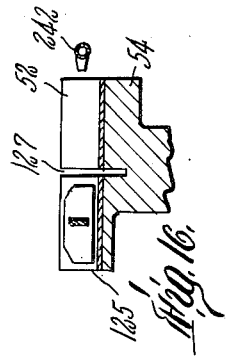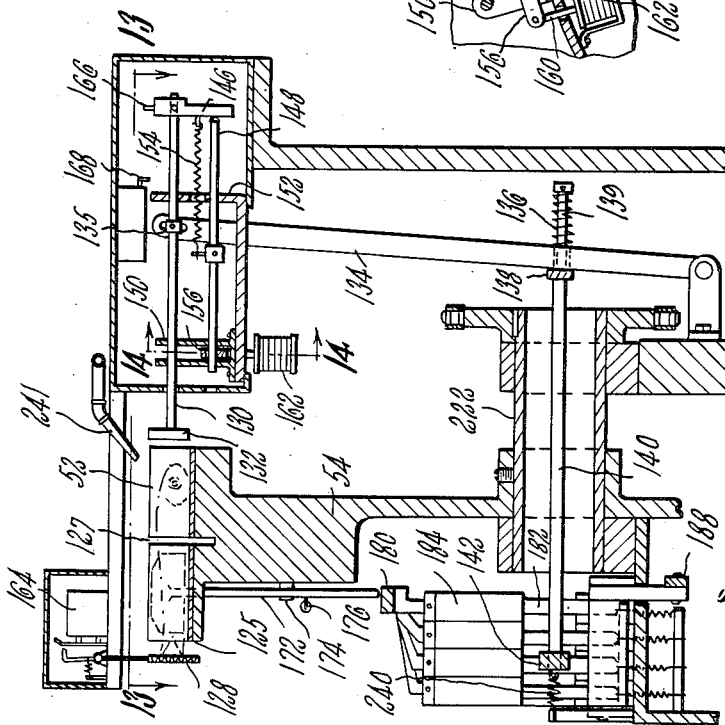

United States Patent Office 2,771,632
Patented Nov. 27, 1956

2,771,632

MECHANISM FOR PREPARING FISH FOR CANNING

Harry E. Walker, Bath, Maine, assignor to Walker's Fish-machinery, Inc., Bath, Maine, a corporation of Maine Application January 29, 1953, Serial No. 333,868

5 Claims. (Cl. 17—4)

This invention relates to a machine for decapitating small fish such as herring which are to be packed as sardines in tin cans. An object of the invention is to obviate many of the operations now manually performed in the process of canning small herring as sardines. According to the invention, a machine is provided which accepts such fish in bulk, separates and orients them then cuts off the heads. A second cut is made four inches from the first cut if the headless portion of the fish exceeds four inches (the length of the interior of a standard sardine can), but in such cases the tails are cut off and the first cut is four inches from the tail cut so that all of the tail portion of the fish is saved and the excess length, if any, which is cut off and discarded is at the head end. If the headless part of the fish is less than four inches long, the tail is not cut. Small herring or equivalent fish of any size now considered suitable for packing in sardine cans are accurately cut to the correct length.

A further object of the invention is to prepare the cut fish so that they will be ready to be packed into cans. To this end, provision is made for gutting the fish and washing out the cavities left by the removal of the entrails. The interior of these cavities are then substantially dried, after which the exterior surfaces of the fish are dried. The fish bodies are then ready to be packed in cans which are sealed after any other desired substances, such as vegetable oil, have been added. The fish are cooked in the sealed cans in the usual manner. The thorough removal of moisture from the inner and outer surfaces of the fish is very important as otherwise the consumer finds upon opening a can an objectionable watery fluid.

For a more complete understanding of the invention, reference may be had to the following description thereof and to the drawing, of which—

Figure 1 is a side elevation of a machine for cutting, gutting, washing and partially drying small fish;

Figure 2 is a section, on a larger scale, on the line 2—2 of Figure 1;

Figure 3 is an enlarged sectional view of one of the belts shown in Figure 2;

Figure 4 is a plan view of the apparatus shown in Figure 1;

Figure 5 is a perspective view of an orienting pan shown in Figures 1 and 4;

Figure 6 is a section, on a larger scale, on the line 6—6 of Figure 4;

Figure 6a is a wiring diagram for mechanism controlling the gates;

Figure 7 is a section on the line 7—7 of Figure 6;

Figure 8 is a section on the line 8—8 of Figure 6;

Figure 9 is a section, on a larger scale on the line 9—9 of Figure 1;

Figure 10 is a section on the line 10—10 of Figure 6;

Figure 11 is an elevational view, indicated by the line 11—11 of Figure 1 and on a larger scale, of part of the apparatus;

Figure 12 is a section on the line 12—12 of Figure 11;

Figure 13 is a section on the line 13—13 of Figure 12;

Figure 14 is a section on the line 14—14 of Figure 13;

Figure 15 is a section on the line 15—15 of Figure 11;

Figure 16 is a section on the line 16—16 of Figure 11.

Small fish in bulk can be dumped into a tank 20 from which a conveyor 22 lifts them and deposits them in an inclined trough 24. The conveyor 22 is provided with transverse ribs 26 between which the fish are caught and carried along. The conveyor is preferably driven constantly by a suitable motor 28. A trough 24 is provided with a spray head 30 which maintains a stream of water to the delivery end of the trough overhanging an inclined pan 32. At the lower end of the pan is a series of grooves 34, four such grooves being shown in Figure 5 by way of example. The mechanism can be constructed with one such groove or with any convenient number more than that. A spray pipe 36 is mounted over the pan 32 as shown in Figure 5 to augment the stream of water received from the trough 24 with fish entrained therein. The pan 32 is inclined at a small angle as indicated in Figure 1 so as to orient the fish which are received from the trough 24 and which slide down through the grooves 34. The head end of each fish, being heavier than the tail end, tends to turn the fish so that its head is pointed downward. Thus for the most part the fish enter the grooves 34 headfirst.

If a more rapid and certain orientation of the fish is desired, turning mechanisms such as are illustrated in Figures 17 to 22 and are hereinafter described in detail may be mounted between the conveyor 22 and the grooves 34. These mechanisms are also effective to equalize the distribution of the fish to the four grooves.

From the grooves 34 the fish are delivered onto conveyors 40 consisting of the inclined upper stretches of endless V-belts. These conveyors, as shown in Figure 1, travel upward, there being one for each groove. At suitably spaced intervals on each conveyor 40 are pairs of small wires 42 which project up therefrom and diverge as indicated in Figures 2 and 3, these wires being of noncorrodible metal such as stainless steel. The function of each pair of wires is to catch behind the gills of a fish which is deposited on the conveyor and thus to advance the fish up the incline for delivery into a corresponding sluice hereinafter described. The major portion of each conveyor 40 is within a channel member 44 which has upwardly diverging side walls as indicated in Figure 2, but these side walls are cut away along the lower portion of each conveyor so that in case fish are piled on each other in any of the grooves 34 and as thus superposed are delivered to the respective conveyors, the uppermost fish will fall off into a receiving tank 46 which underlies the pan 32, the grooves 34 and the lower portion of the conveyors 40.

Each conveyor 40 is thus designed to convey a series of single fish headfirst for delivery into the corresponding sluice 50. The sluices 50 are preferably of a suitable synthetic resin such, for example, as methyl methacrylate, commercially known as "Lucite," or a cellulose derivative such, for example, as a cellulose acetate compound commercially known as "Tenite." The progress of the fish in the several sluices is controlled by two gates in each sluice illustrated in Figure 6 and hereinafter described in detail. From the sluices 50 the fish are delivered into individual buckets 52 on the periphery of a wheel 54 illustrated in Fig. 11. As shown, the buckets 52 may be in the form of open-ended troughs arranged parallel to the axis of the wheel and open radially outward. The wheel 54 is mounted with its axis more nearly horizontal than vertical so that fish can be received in the upper buckets. In the drawing the wheel is shown on a horizontal axis but can be tilted so that the buckets which are in line with the sluices 50 slope downward away from the sluices. After entering the buckets which are opposite the respective sluices 50 and being stopped at the further end of the buckets, the fish are moved laterally by an indexing movement of the wheel 54 to a locating station where they are pushed back to the positions in the buckets which they should have so that when the wheel is again indexed they will be cut correctly by a pair of rotating disk knives 56 and 58 which cut off the heads and may cut off part or all of the tails, leaving a body portion not over four inches in length. The body portion of each fish is subsequently delivered to a conveyor 60 which deposits it in a receptacle or on a travelling conveyor 62, the heads and tails which have been cut off being discarded into a waste receptacle (not shown).

The progress of each fish as it is delivered by one of the conveyors 40 into a sluice 50 is controlled by an intermediate gate 64 approximately midway between the ends of the sluice and a discharge gate 66 near the discharge end of the sluice. Since the sluices 50 with their control mechanisms are all alike, a description of one will serve for all. Just before a fish reaches the intermediate gate 64 it intercepts a light beam which is projected across the sluice toward a photo-electric cell 68. The discharge gate 66 is mechanically operated in timed relation with the indexing movement of the wheel 54. Each such movement brings four of the buckets 52 in line with the sluices 50 so as to be in position to receive individual fish from the sluices. As hereinafter explained, immediately before each indexing movement of the wheel 54 the discharge gate 66 of each sluice is automatically closed. The closing of the gate 66 closes a switch 70, this switch being in a circuit which includes a suitable source 72 of electrical energy and a solenoid 74 arranged to open the intermediate gate 64 (Figure 6a). The opening of the gate 64 is accompanied by the opening of a switch 76 which is in a series with a source of electric energy 78, a relay 80 and the photo-electric cell 68. The relay 80 is normally energized and when energized holds a switch 82 open, this switch being in series with a source of electric energy 84 and a solenoid 86 which when energized operates to throw out a clutch 88 which is otherwise held closed by a spring 89 and which connects the conveyors 40 with a drive shaft 90 (Figure 9). When the relay 80 is deenergized, the switch 82 is closed by a spring 92 thus energizing the solenoid 86 and throwing out the clutch 88 so that the conveyor 40 stops. The weight of the conveyor belt and the pulleys about which it passes is small so that there is little inertia in the system and the stopping is almost instantaneous. The gate 66 is open (as shown in Figure 6) except during the brief intervals in which the wheel 54 is being indexed. As long as the gate 66 is open the switch 70 is also open and the gate 64 is shut. If there is then no fish in the upper part of the sluice 50, the conveyor 40 operates until a fish is delivered into the sluice 50 or until the gate 64 opens. Whenever the gate 66 closes the switch 70 also closes causing the gate 64 to open which is otherwise held shut by a spring 93. If a fish is at that moment against the gate 64 it advances to the gate 66. The conveyor 40 does not move while the gate 64 is open so no fish is delivered to the sluice at this time. When the indexing movement of the wheel 54 is completed the gate 66 opens at once and if a fish is against it, this fish advances into the bucket 52 aligned with that sluice. The opening of the gate 66 closes the gate 64 and the latter remains closed until the wheel 54 is about to be indexed again. When the gate 64 closes, the switch 76 also closes, energizing the solenoid 80 if there is then no fish in the upper part of the sluice intercepting the light beam to the photo-electric cell 68. This opens the switch 82 and deenergizes the solenoid 86, allowing the spring 89 to close the clutch 88 connecting the conveyor 40 to the rotating shaft 90. As soon thereafter as the conveyor delivers a fish into the sluice, the fish is stopped by the gate 64 in position to intercept the light beam to the photo-electric cell 68.

This instantly deenergizes the solenoid 80 and results in stopping the conveyor 40 which does not resume operation until the gate 64 has been opened to permit the fish to advance and has then been closed again. This interaction between the gates and the clutch which controls the conveyor drive avoids any accumulation of fish in the sluices which would interfere with the proper functioning of the machine as a whole.

In order to propel the fish rapidly past the gate 64 and down the sluice when it is free to move, a jet of water is introduced through the floor of each sluice near the upper end thereof by a suitable water connection 94 and is directed down the sluice. This lubricates the floor of the sluice. From each side wall of each sluice a fine but powerful water jet is projected through a suitable nozzle 95 and is directed down the sluice. These jets catch the fish behind its gills if the fish is properly directed headfirst down its sluice and propel it rapidly when the gates allow it to move.

Since the gate 64 opens only when the gate 66 closes, a fish after passing the gate 64 will be stopped briefly in the lower part of the sluice by the gate 66. To start it again and propel it rapidly past the gate 66, a second set of water jets is provided in each sluice. These jets are directed down the sluice and comprise a floor jet 96 and a side jet 97 through each side wall of the sluice. The floor jet helps to float the fish along. The side jets 97 catch the fish behind the gills and quickly eject it from the sluice into a bucket 52. This set of jets is controlled by a valve 98 which is operated as hereinafter described to permit the jets to flow only when the gate is open.

If a fish should get into a sluice tailfirst, its further progress would not be as rapid as when headfirst since the side jets would not catch the fish behind the gills. Hence the fish in such cases is discharged more slowly from the lower end of the sluice. Since it is not desirable that a fish enter tailfirst into any of the buckets 52, a movable threshold 102 is provided at the lower end of each sluice, each threshold being supported by a pair of arms 103 which are pivoted at 104 so that the floor of the threshold which is normally flush with the floor of the sluice 50 can be swung down to the position shown by dotted lines in Figure 6, thus permitting a fish to be discharged below the rim of the wheel 54 so that it does not enter a bucket 52. Each threshold 102 is lowered simultaneously with the closing of the corresponding discharge gate 66. For this purpose the gate 66 is operated by a rod 105 which extends through an arm of a cross-head 106 slidable on a fixed vertical post 108. The upper end of the rod 105 has a head 110 which bears on the arm of the cross-head so that when the cross-head is elevated it acts on the rod 105 to swing the gate 66 open against the pull of a spring 112. The cross-head 106 is raised and lowered by a rod 114 which connects it to the threshold 102. The threshold is connected by a link 116 to an equalizer bar 118 (Fig. 10). The bar 118 is raised and lowered by a cam-operated lever 120 which is pivotally mounted at 122 as indicated in Figure 11. Each cross-head 106 is pushed upward by a spring 124 which compensates in part for the weight of the parts connected to the cross-head. Since the rod 105 extends loosely through an arm of the cross-head 106, the gate 66 closes during the initial portion of the downward movement of the threshold 102. For a similar reason the gate 66 remains closed during the upward movement of the threshold 102 until the latter has nearly reached the position shown in Figure 6. At the end of the upward stroke the cross-head also engages and opens the valve 98 thus causing the jets 96 and 97 to operate as long as the cross-head is in its elevated position and the gate 66 is open. Any other convenient means may be employed to operate the valve 98 in timed relation with the movements of the gate 66. If a fish should enter a sluice tailfirst in leaving the sluice, the propelling jet of water could not engage behind the gills so that the movement of the fish would be sluggish. Hence it would not enter far into the bucket 52. Subsequent lowering of the threshold thus causes the fish to fall through between the sluice and the adjacent end 125 of the bucket, leaving the bucket empty.

A suitable stop member 126 is provided at the loading station adjacent to the further end of the four buckets which are aligned with the sluices 50 so that when the fish are propelled into these buckets they will all be stopped by the stop member 126 in positions beyond the correct positions for being cut. The wheel 54 is then indexed to move these buckets from the loading station to a positioning station where mechanism is provided, as illustrated in Figures 12 and 13, for individually adjusting the position of each fish in its bucket so that it will be correctly located for cutting by the knives 56 and 58. The knives are arranged, as indicated in Figure 15, so that the knife 56 cuts off the portion of the fish tail which projects beyond the end 125 of the bucket. Four inches from that end each bucket has a transverse slot 127 to receive the knife 58 when the bucket is moved past the knife. Hence the object of the positioning mechanism is to locate each fish with respect to the bucket in which it lies so that the proper points for cutting will be at the end 125 and slot 127, respectively, of the bucket containing the fish.

The buckets 52 which are in the positioning station are each in line with a corresponding gage in the form of a switch-actuating lever 128 at the tail end of the bucket and a push rod 130 which has a head 132 adapted to enter the head end of the bucket to engage the nose of the fish therein. The lower end portion of each lever 128 is in the form of a piece of wire netting having a size and shape approximately equal to the cross-sectional area of a bucket 52, as indicated in Figure 11. For actuation of the push rods 130, a lever 134 is provided for each such rod (Figures 12 and 13). The lever is operatively connected near its upper end to the rod 130 by a fitting 135 and is resiliently actuated by a spring 136 which presses against a transverse bar 138 engaging all of the four levers 134, each spring being carried by a rod 139 which is mounted on the bar 138 and extends through a lever 134. The bar 138 is attached to a horizontal rod 140 which is axially reciprocable by an arm 142 pivotally mounted at 144 (Figure 11). The arm 142 is rocked by a cam as hereinafter described and in turn reciprocates the several push rods 130 through resilient connections so that the push rods are advanced by yielding means. Each push rod 130 has a pusher head 132 at one end and a cross-head 146 at the other end. The cross-head bears against a rod 148 which is parallel to the rod 130 and is slidable through supports 150 and 152 which also support the rod 130. A tension spring 154 connects the cross-head 146 with the rod 148 so as to hold an end of the rod 148 resiliently against the cross-head 146. Between the upright supports 150 is a brake shoe 156 which, as shown in Figure 14, is pivoted at one end as at 158, the other end being connected by a rod 160 to a solenoid 162. When the solenoid 162 is energized it pulls strongly on the brake shoe 156 so as to hold the rod 148 tightly against any further axial movement. As soon as a set of buckets have moved into the positioning station, the rod 140 is actuated to advance the push rods yieldingly toward the respective buckets. As each push rod 130 advances into its bucket 52, it pushes the fish therein ahead of it and also pushes its rod 148 by means of the cross-head 146 against which the rod bears. The fish is pushed backward by the pusher head 132 until its tail engages the lever 128, if the fish is of sufficient length. The lever 128 is constructed for operation in response to light pressure so that when engaged by the tail of a fish it promptly closes a switch 164 which is connected in a circuit containing the corresponding solenoid 162, so that when any one of the four switches 124 closes, the corresponding rod 148 is instantly gripped by its brake shoe 156, thus stopping further progress of the push rod 130. The fish is then in correct position to be carried to the rotating knives 56 and 58. The lever 128 thus acts as a gage to determine the position of a fish by the location of its tail in a predetermined relation to the planes of the knives.

The maximum advance of the pusher head 132 is limited by the provision of a lug 166 on the cross-head 146 which is arranged to engage and close a switch 168 when the pusher head reaches a predetermined point which is spaced from the slot 127 by a distance of about one inch, that is, the approximate length of the head portion of a small fish. The switch 168 is in parallel with the corresponding switch 164 so that when it closes, the corresponding solenoid 162 is energized to stop the pushrod 130. Thus if the fish in the bucket is so small that the lug 166 reaches the switch 168 before the fish's tail touches the lever 128, the fish is stopped in the correct position for decapitation, but the tail is not cut off.

When the fish in any or all of the four buckets at the positioning station have individually been properly located in their respective buckets by the pushrods 130, as illustrated in Figure 13, the fish are then firmly clamped in their buckets so as to hold them in position so they are moved past the knives 56 and 58. For this purpose each bucket is provided with a suitable clamp 170 (Figures 7 and 8) carried by a lever 172 which is pivoted as at 174 (Figure 11) on the wheel 54. Each lever 172 is connected to a spring 176 which tends to move the clamp 170 toward its gripping position and thus to engage resiliently the body of a fish in the bucket. An arcuate cam 178 is engaged by the inner ends of the levers 172 to hold the clamps retracted in buckets moving into the loading station as illustrated in Figure 11, to receive fish. The clamps therein are allowed to close as the levers move clear of the cam 178 during the advance of these buckets to the positioning station. Mechanism is provided to open these clamps to permit the functioning of the positioning mechanism. For this purpose vertically movable cam elements 180 are mounted on rods 182 which are slidable in a bracket 184. These four rods are adapted to be raised by an arm of a bell crank 186 which is rockable by a link 188 attached to an arm 190, the latter being pivoted at 192 and carrying a cam follower 194 so as to be rocked by a cam as hereinafter described. At a suitable moment in the operation of the machine the bell crank 186 is rocked to raise the four rods 182 so as to retract the clamp members 170 which are in the buckets at the positioning station. When the rods 182 are thus raised, each is retained in its elevated position by a latch 196 which engages in a notch 198 in the rod, thus holding these rods elevated until the latches 196 are individually retracted by respective solenoids 200. Each of these solenoids is in series with the corresponding control switches 164 and 168 (Figure 12) so that when either of these switches is closed as hereinbefore described, not only is the progress of the corresponding pushrod 130 arrested but the corresponding clamp member 170 is released to be closed by its spring 176 so as to grip the fish in that bucket. The fish is then ready to be advanced to the knives 56 and 58 which cut off one or both ends of the fish, as indicated in Figure 15, leaving a four-inch body piece to be packed. After the buckets have passed the knives and have progressed beyond gutting and drying stations, the end of the clamp levers 172 ride onto the cam 178 and are rocked to open the clamps so as to allow the fish bodies to fall onto the conveyor 60.

The knives 56 and 58 are constantly rotated at high speed, preferably by a separate motor 204, another motor 206 being provided for the operation of the cams and the wheel 54. The motor 206 is connected by a suitable belt 208 to a wheel 210 mounted on a shaft 212 (Figure 11) which is constantly rotated. The shaft 212 carries a pin 214 which is part of a Geneva movement 216 by which a shaft 218 is intermittently rotated for the step-by-step indexing movements of the wheel 54. For this purpose the shaft 218 is connected by a suitable belt or chain 220 to the hub 222 of the wheel 54, this hub being hollow so that the rod 140 can extend therethrough.

Mounted on the shaft 212 are three cams 230, 232, and 233. These cams operate in timed relation with the indexing of the wheel 54. Figure 11 shows the position of the cam shortly before the wheel 54 is to be indexed. Each indexing movement of the wheel takes place during somewhat less than a quarter turn of the shaft 212, the ensuing dwell of the wheel lasting through the remainder of a full revolution of this shaft. The cam 230 is engaged by the follower 236 and has a high portion and a low portion. As the shaft 212 rotates in a counter-clockwise direction as shown in Figure 11, the follower 236 moves onto the low portion of the cam just before the wheel 54 is indexed, thus causing the gate 66 to close, and moves onto the high portion of the cam 230 immediately after the indexing of the wheel, thus keeping the gate 66 open during the ensuing dwell.

The cam 232 has a high point which reaches the follower 194 and rocks the lever 190 to elevate the elements 180 just after each indexing movement of the wheel 54, so that as soon as a set of buckets move into the positioning station, the clamping jaws 170 therein are immediately retracted and the fish are then ready to be pushed back to proper positions for cutting.

The cam 233 is a face cam against which the follower 238 bears. This cam has a low part 234 which permits the lever 142 to be rocked by a spring 240 for resiliently rocking the levers 134 to advance the individual push rods 130 (Figure 12). This occurs just after the elements 180 have been elevated to retract the clamps in the buckets which are at the positioning station.

To keep the fish from sticking in the buckets when they are engaged by their respective pushers, a stream of water is directed into each bucket from a suitable nozzle 241. Since the portion of each switch lever 128 opposite the end of its bucket is open-mesh screen, the stream of water projected into the bucket passes through the screen so that the lever is not tripped until engaged by the tail of a fish in the bucket.

After a group of four fish have been carried past the knives 56 and 58 by an indexing movement of the wheel 54, they stop briefly at a gutting and washing station where a fine, high-pressure jet of water is directed against the headless end of each fish from a series of nozzles 242. These jets gut the fish and wash out the resulting cavities. The next indexing movement of the wheel brings the fish to a drying station where a jet of superheated steam or highly heated air is directed against the headless end of each fish from nozzles 243. These jets act to expel mechanically practically all of the free water in the cavities in the fish left by the gutting operation, the heat of the steam or air serving to remove also a substantial portion of the residual moisture in these cavities. The jets are preferably intermittent, being turned on when the wheel 54 is stationary and being turned off when the wheel is being indexed. Suitable valves 244 and 245 are employed for this purpose. These valves may conveniently be operated by the lever 120 which is rocked by the cam 230 in timed relation to the indexing movements of the wheel 54.

The conveyor 60 which receives the fish bodies from the buckets is constantly driven by suitable driving connections with the motor 204 to deliver the bodies to the conveyor 62 of drying apparatus. A heater 246 may be mounted beneath the portion of the conveyor 60 to assist in the operation of removing surface moisture from the fish.

A motor 247 is provided for driving the several conveyors 40 which deliver fish to the sluices 50. Since each of these conveyors is separately controlled by the gate 64 and electric eye 68 in its respective sluice, a separate clutch 88 is provided for each conveyor. To this end, the motor 247 is operatively connected by suitable means indicated in Figures 1, 6 and 9, to a series of shafts 90 each of which is connected by a clutch 88 to a corresponding conveyor 40. Such means may include a pulley 248 on the shaft of the motor 246 connected by a belt or chain 250 to a double pulley 252 on one of the shafts 90. A belt or chain 254 connects the pulley 252 with other pulleys on the other shafts 90 so that all turn together constantly. Each shaft 90 is separately connected by a clutch 88 to a coaxial shaft 256 (Figure 9) which is connected by a belt 258 to a double pulley 260 loosely mounted on a shaft 262. Each double pulley 260 also has one of the conveyors 40 engaging thereon to be driven thereby.

I claim:

1. Apparatus for preparing fish for packing in cans, comprising a frame, a wheel rotatably mounted on said frame having a series of buckets at its circumference extending parallel to the axis of the wheel and each adapted to receive a single fish therein, means mounted at one side of said wheel for introducing single fish headfirst substantially simultaneously into a plurality of successive buckets near the top of the wheel, means mounted at the other side of said wheel for moving each fish rearward in its bucket into position for cutting off the head thereof, means on said frame automatically operating to clamp the body of each said fish in its bucket after being so located, two disc knives mounted on said frame adjacent to the circumference of the wheel and rotatable about an axis parallel to the axis of the wheel, means on said frame for indexing the wheel to move the clamped fish into engagement with said knives, and means associated with said clamping means for thereafter releasing said fish bodies.

2. Apparatus as in claim 1, and means mounted on said frame near said knives for directing jets of water against the decapitated ends of the clamped fish bodies whereby to gut said bodies.

3. Apparatus as in claim 2, and means on said frame for directing jets of hot fluid against the decapitated ends of the clamped fish bodies after the same have been subjected to said water jets, whereby to evacuate moisture from the visceral cavities.

4. Apparatus for preparing fish for packing in cans comprising a frame, a wheel on said frame having a series of buckets on its circumference, each bucket being in the form of an open trough extending parallel to the axis of the wheel, means for indexing said wheel by successive steps alternating with dwells, a pair of disc knives mounted on said frame for rotation about a fixed axis parallel to that of the wheel and adjacent to the circumference thereof, a clamping member in each said bucket, and means adjacent to said wheel operating to move each clamping member into gripping relation with the body of a fish in the corresponding bucket when the bucket reaches a predetermined point in its approach toward said knives and for moving said clamping member to release said fish body after said bucket has passed said knives.

5. Apparatus for preparing fish for packing in cans, comprising a frame, a wheel on said frame having a series of buckets on its circumference adapted to receive individual fish therein, means mounted at one side of said wheel and adjacent thereto for introducing fish into a plurality of said buckets simultaneously, members carried by said wheel for gripping the bodies of said fish in the buckets, rotating disc knives on said frame adjacent to said wheel, means on said frame for actuating said gripping members to grip the fish in the buckets before they reach said knives, means for indexing said wheel to move the gripped fish against the edges of said knives to cut off the heads thereof, and means on said frame for thereafter actuating said gripping members to release the bodies.

References Cited in the file of this patent

UNITED STATES PATENTS

| | | |
|---|---|---|
| 705,474 | St. James | July 22, 1902 |
| 1,049,208 | Cleveland | Dec. 31, 1912 |
| 1,078,717 | Cleveland | Nov. 18, 1913 |
| 1,078,719 | Cleveland | Nov. 18, 1913 |
| 1,092,394 | Reno | Apr. 7, 1914 |
| 1,125,657 | Cleveland | Jan. 19, 1915 |
| 1,185,744 | Weber et al. | June 6, 1916 |
| 1,247,502 | Butler | Nov. 20, 1917 |
| 1,394,185 | Rogers | Oct. 18, 1921 |
| 1,833,874 | Griffith et al. | Nov. 24, 1931 |
| 1,907,989 | Mann | May 9, 1933 |
| 1,967,229 | Drevitson | July 24, 1934 |

FOREIGN PATENTS

| | | |
|---|---|---|
| 993,326 | France | July 25, 1951 |